(12) United States Patent
Campana

(10) Patent No.: US 8,404,995 B2
(45) Date of Patent: Mar. 26, 2013

(54) TOOL MACHINE FOR LASER CUTTING OF SHEET AND PIPE MATERIALS

(76) Inventor: Livio Campana, Schio (IT)

( * ) Notice: Subject to any disclaimer, the term of this patent is extended or adjusted under 35 U.S.C. 154(b) by 730 days.

(21) Appl. No.: 12/085,619

(22) PCT Filed: Dec. 13, 2006

(86) PCT No.: PCT/EP2006/012073
§ 371 (c)(1),
(2), (4) Date: Jan. 27, 2010

(87) PCT Pub. No.: WO2007/071341
PCT Pub. Date: Jun. 28, 2007

(65) Prior Publication Data
US 2010/0147810 A1    Jun. 17, 2010

(30) Foreign Application Priority Data

Dec. 20, 2005    (IT) ................................ VI2005A0339

(51) Int. Cl.
*B23K 26/00* (2006.01)
*B23K 26/14* (2006.01)

(52) U.S. Cl. ................................. 219/121.67

(58) Field of Classification Search ............. 219/121.67
See application file for complete search history.

(56) References Cited

U.S. PATENT DOCUMENTS

| 4,443,684 | A | 4/1984 | Sakuragi |
| 4,797,532 | A * | 1/1989 | Maiorov ................. 219/121.74 |
| 5,635,086 | A | 6/1997 | Warren, Jr. |
| 5,660,748 | A | 8/1997 | Tanaka |
| 6,420,674 | B1 | 7/2002 | Cole, III |
| 6,463,728 | B1 | 10/2002 | Daoud |
| 6,486,436 | B1 | 11/2002 | Shah |

FOREIGN PATENT DOCUMENTS

| EP | 1 468 775 A | 10/2004 |
| JP | 11-000774 A | 1/1999 |
| JP | 2002-001558 A | 1/2002 |
| WO | WO 00/54925 A | 9/2000 |

OTHER PUBLICATIONS

PCT Search Report Dated Apr. 2, 2007.

* cited by examiner

*Primary Examiner* — William D Coleman
(74) *Attorney, Agent, or Firm* — Hedman & Costigan, P.C.; James V. Costigan

(57) ABSTRACT

A tool machine for laser cutting of materials (25), comprising a support table for the materials (10), a main cutting unit (11), a control panel (12) integrated on the machine, remote controlled and managed by a PC, and a laser cutting head (13) connected to a cooling unit, and moveable on the table by means of a numerical control system, wherein the laser cutting head (13) is connected to an optical fiber laser generator (20); the laser cutting head (13) is also equipped with a system that automatically controls the height of the material surface (25) to be cut, as well as an optical fiber motion and protection system (20) which moves the laser beam (23) on the machine.

3 Claims, 5 Drawing Sheets

TOOL MACHINE FOR LASER CUTTING OF SHEET AND PIPE MATERIALS

The present invention relates in general to a tool machine to be used for the laser cutting of metal and non-metal materials.

More particularly, the invention relates to a flatbed tool machine for the laser cutting of materials having an innovative technological structure.

The invention is extended to cover the application of the laser generator on the tool machine, the automatized guide system of the laser head, as well as the protection and guide system of the laser beam on the machine.

Laser cutting, and above all, the type used for cutting very thick materials, is always performed using carbon dioxide ($CO_2$) gaseous laser sources, in other words Nd-Yag gaseous laser sources (Neodymium-Yttrium-Aluminium).

It is known that $CO_2$ laser sources are able to provide an extremely powerful high quality beam for cutting sheet metal and metal plate; in addition various types of cutting machine tools are used for practical applications, using lens and/or mirror systems for high precision beam focus.

On the other hand, Nd-YAG lasers are normally used for material surface marking because of the high quality of the beam at low power.

Recent developments relating to this type of laser have led to the discovery that Nd-YAG lasers are also able to provide good beam quality, comparable to $CO_2$ lasers, even at power output levels over 100 W; consequently this has made it possible to use Nd-YAG lasers for material cutting, with results that are comparable to those obtained with $CO_2$ lasers.

However, in this case as well, there are considerable transmission losses, low beam quality and basic instability in the emitted power.

The aim of the present invention therefore, is to resolve the problems described above, and in particular, to create a tool machine to laser cut materials, able to provide laser beams of very high quality, without the problems related to cooling and thermal lenses.

Another aim of the present invention is to provide a flatbed tool machine to laser cut materials that permits the construction of an extremely reliable pumping architecture with very high power stability and concentration, which will result in a considerable reduction in piercing times and greatly increased cutting speed.

A further aim of the invention is to provide a tool machine to laser cut materials, which is able to eliminate the use of lasering gas, as well as the lens units and mirror units used on traditional type machines.

By no means the last aim of the present invention is to provide a tool machine to laser cut materials, which is extremely reliable and efficient from a practical point of view, which has a long work life, and which has very reasonable running costs compared to prior art equipment.

These and other aims, according to the present invention, are achieved by a tool machine to laser cut materials according to the appended claim 1; the other subordinate claims include other technical characteristics describing details of the invention.

Advantageously, the tool machine according to the invention is equipped with a laser source having a new concept, with a completely innovative "fiberlaser" architecture, thus providing excellent laser beam quality results and very powerful emission levels (practically unlimited).

The system provides a valid alternative to $CO_2$ or Nd-YAG type lasers for application in the field of metal cutting, whether in sheet, plate, or pipe form.

An optical fibre source is created using an active means wherein optical radiation is generated, a pumping source able to excite the doped ions (or the gas molecules in the case of carbon dioxide or $CO_2$) and two mirrors to create the resonant cavity.

In particular, the aspect that distinguishes a fibre laser source from a solid-state source (such as Nd-YAG for example) is the presence of:
- an optical fibre which replaces the crystal bar,
- various "single" pump diodes to replace the common bars, and
- Bragg gratings, once again in optical fibre, to replace the mirrors.

By analysing the optical fibre laser ("fiberlaser") in more detail, it can be seen that, in spite of their individual simplicity, each of the aforesaid base elements provides the source with unique functional characteristics.

In fact, first of all, thanks to a very reduced doped nucleus (of only 5 microns) the active fibre provides laser beams of extremely high quality in a very efficient manner without any cooling or thermal lens problems.

Furthermore, the use of single pumping diodes that replace the bars of prior art, provide a pumping architecture that is extremely reliable. (In reference to "fiberlasers" MTBF levels over 30,000 working hours are commonplace, in other words, levels are far higher than those obtained using solid-state laser sources).

Lastly, thanks to the intrinsic syntonizing quality and reduced insertion loss, the optical fibre Bragg gratings provide resonant cavities that have high precision syntonization with the emitted wave length of the source, as well as very high emitted power stability levels.

Further characteristics and advantages of the present invention will be made more apparent from the following description of an embodiment, provided as a preferred example, but in no way limiting, of a tool machine for laser cutting of materials, according to the invention and the appended drawings, wherein.

Figure 1:
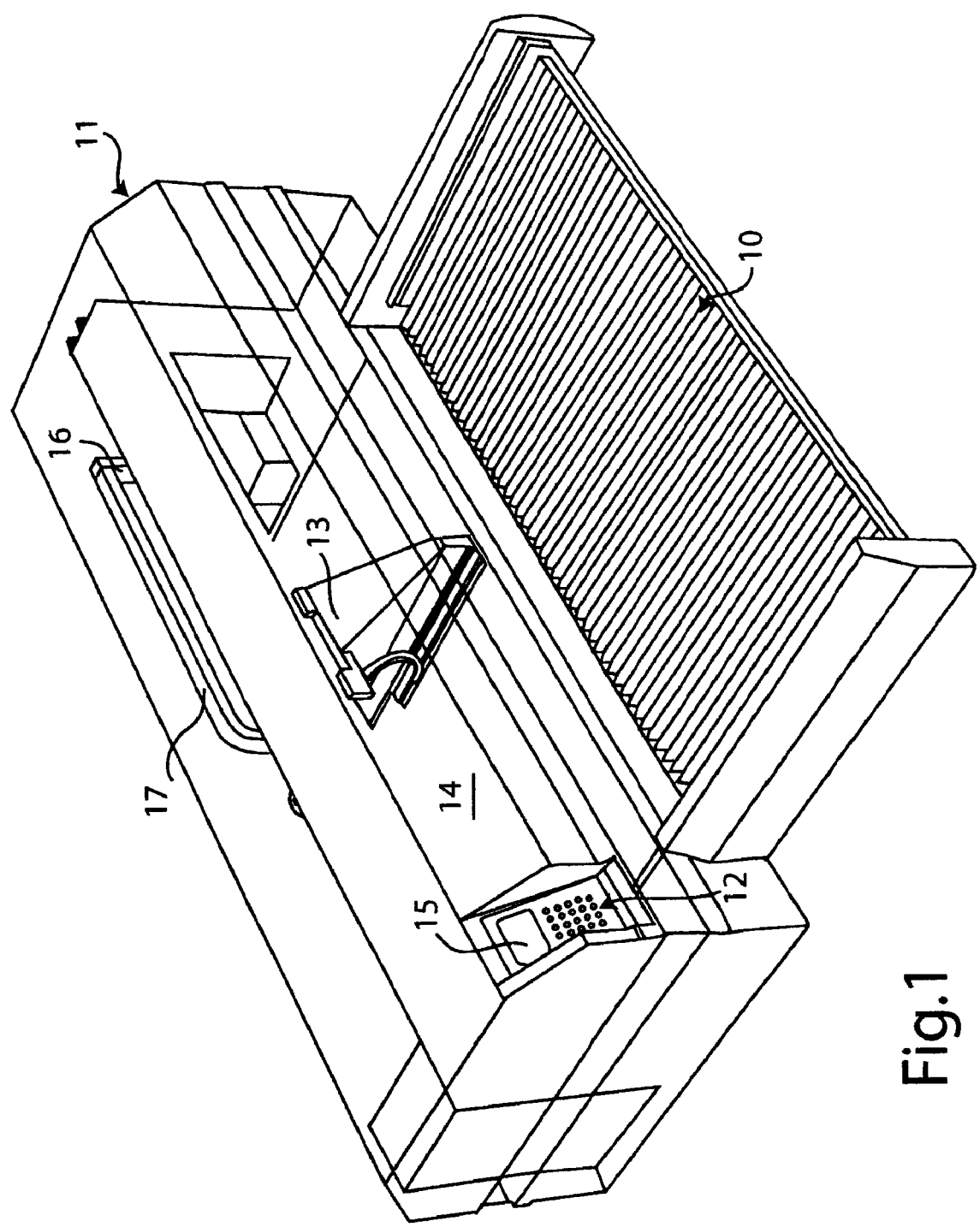
FIG. 1 shows a front view in perspective of the flat-bed tool machine for laser cutting of materials, according to the invention.
Figure 2:
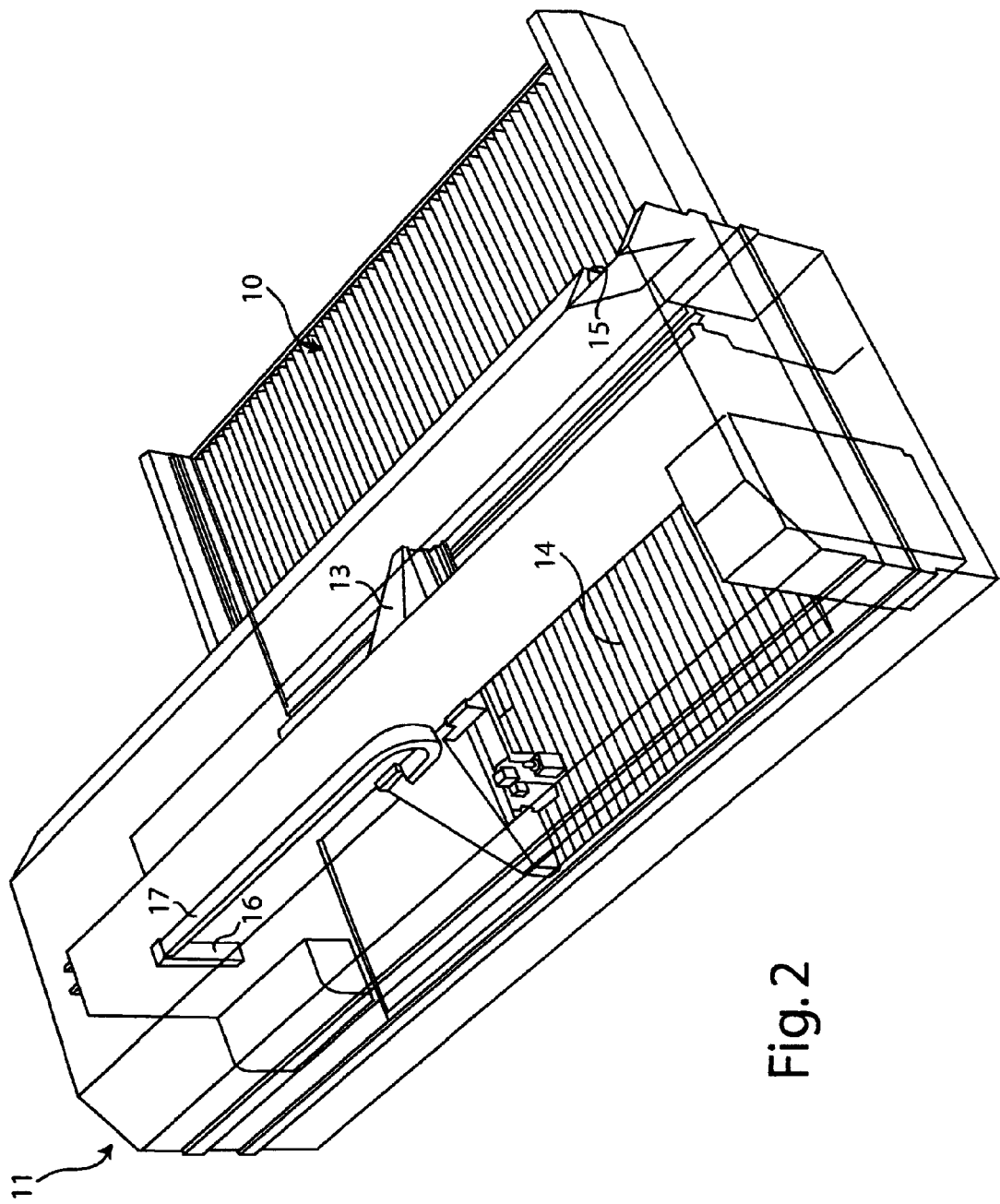
FIG. 2 shows a rear view in perspective of the flat-bed tool machine for laser cutting of materials, according to the invention.
Figure 3:
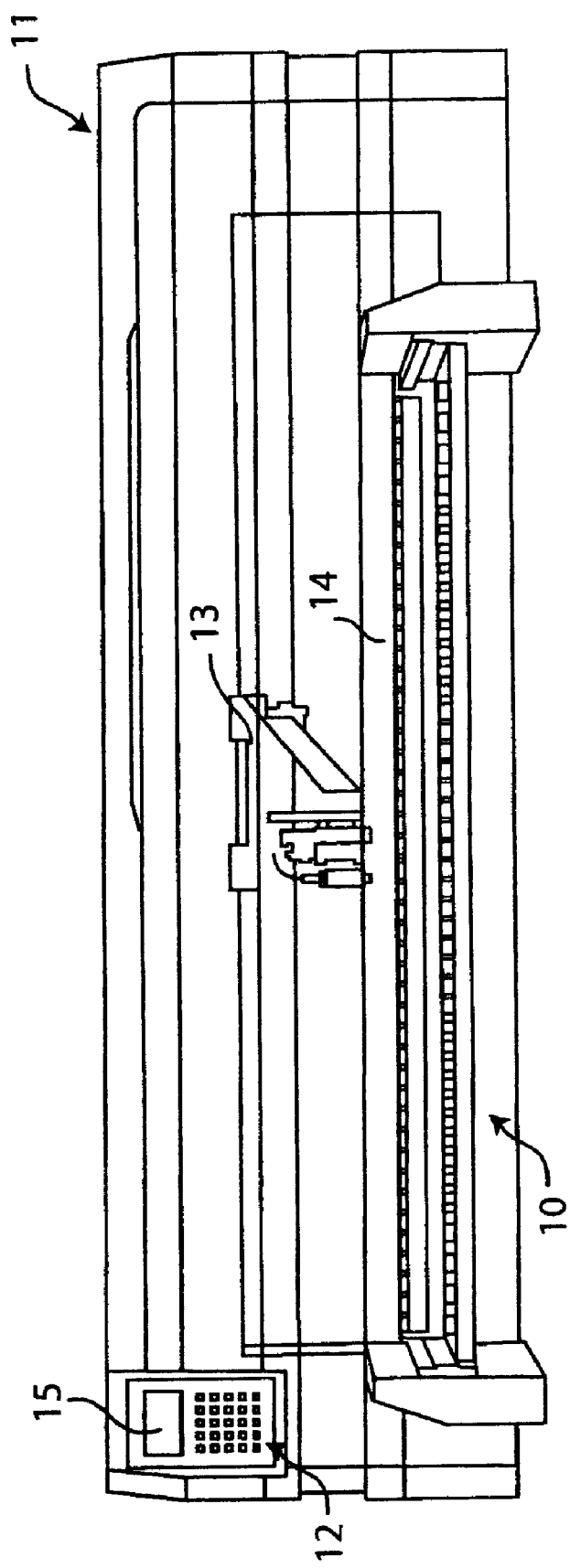
FIG. 3 shows a front view of the flat-bed tool machine for laser cutting of materials, according to the invention.
Figure 4:
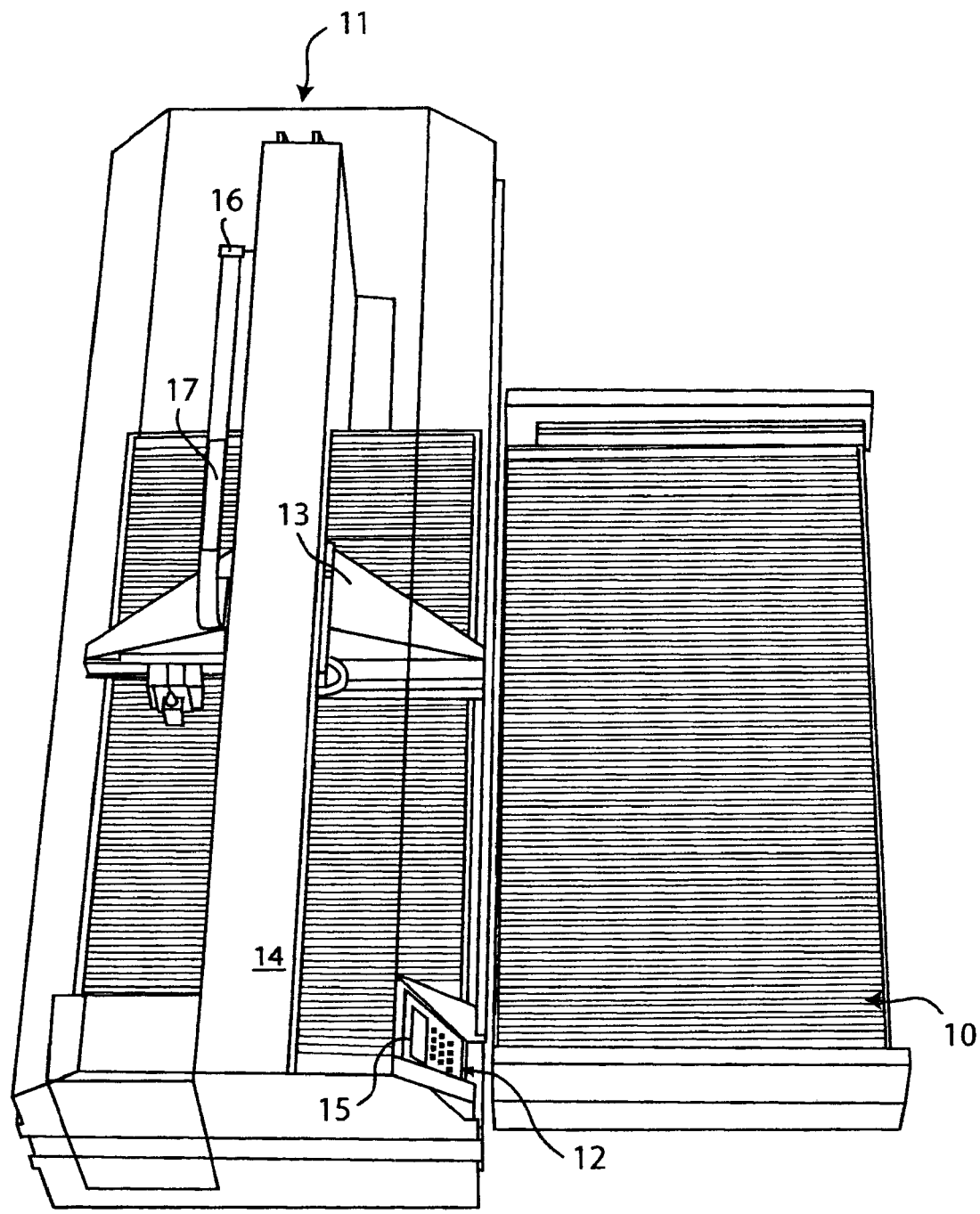
FIG. 4 shows a partial and enlarged plane view seen from above, of the flat-bed tool machine for laser cutting of materials, according to the invention.

In reference to the aforesaid figures, the flat-bed tool machine for laser cutting of materials, according to the present invention is constructed with external protection and shielding that guarantee complete isolation of the machining area during the work cycle, and that is mainly composed of a support table for the materials 10 including the optional supply of a pallet change system, a main cutting unit 11, an integrated control panel 12 and a laser cutting head 13, connected to a cooling unit, as is the laser generator.

In particular the machine is designed and constructed with a fixed modular central guide system, to guarantee high structure resistance strength and maximum rigidity at high speed and during acceleration; this ensures rapid simultaneous positioning speed on the three axes X, Y, Z on table 14, or the pipe support chuck, for an extremely vast operating capacity.

Furthermore, the machine can be preferably flatbed type for machining sheet metal; in other words, it can be used on 4-5 axes for pipe machining.

The system is able to provide high repeatability precision and circular/linear interpolation on 3 or 5 axes.

In addition, the machine includes a remote controlled control panel 12, controlled from a personal computer integrated on the machine; the control panel 12 is equipped with a colour display 15 and an integrated PLC for the execution of auxiliary functions.

The cutting head 13 is equipped with an automatic height control system and an anti-collision control system for constant machining precision, this protecting the cutting unit; the aforesaid cutting head is also equipped with a system for high pressure and/or compressed air gas feed to the laser generator.

The innovative constructive technology and performance achieved by the tool machine according to the invention comprise an exclusive innovation in the laser cutting sector; in fact, the tool machine, object of the present invention, uses a fibre laser generator ("fiberlaser") and also comprises a particular numerically controlled movement technique for the laser cutting head 13.

Figure 5:
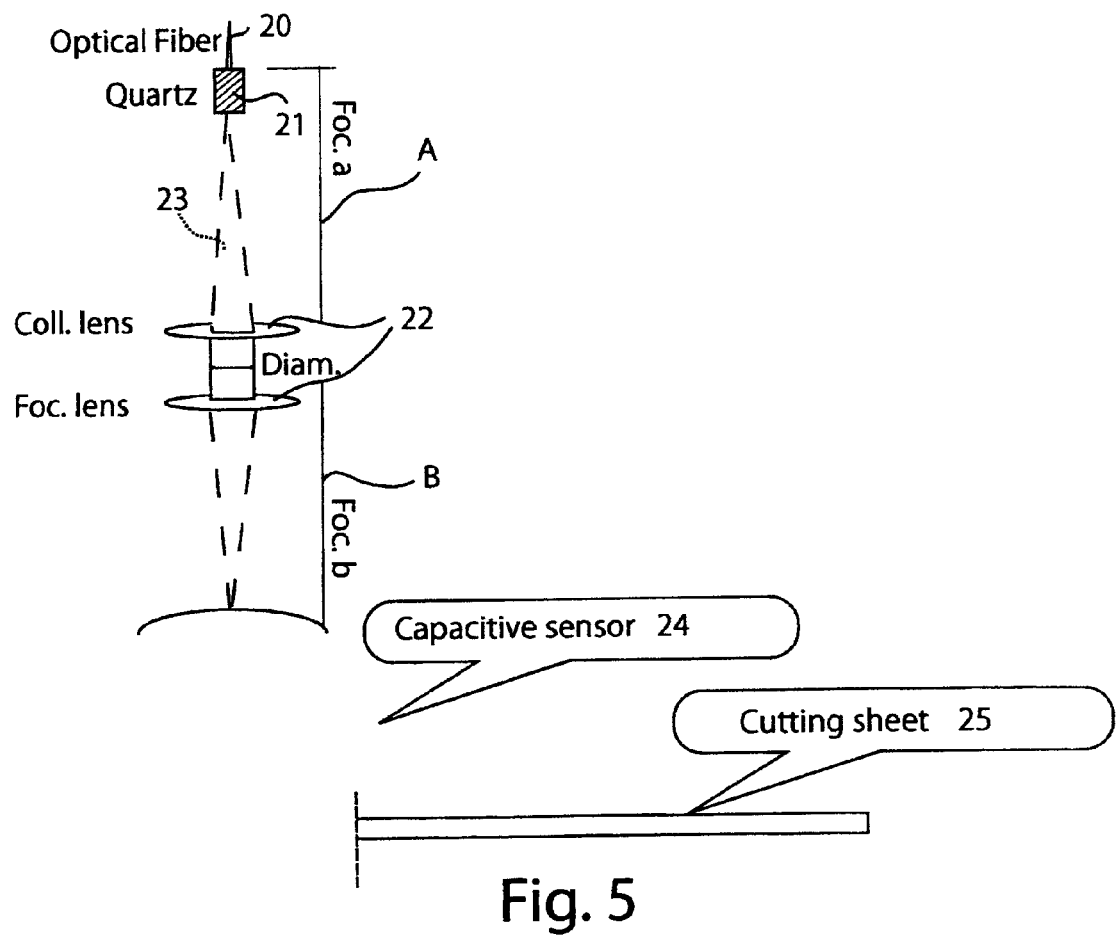
FIG. 5 shows a tentative outline for the application of an automatic laser cutting head height control system, used on the flat-bed tool machine according to the present invention.

In special reference to the appended FIG. 5, the optical fibre source is created using an optical fibre as the active means, which generates the optical radiation, various single quartz pumping diodes 21 able to excite the doped ions, and Bragg lens or gratings 22, in optical fibre to create the resonant cavities.

Thanks to a doped nucleus of only 5 micron, the active fibre 20 is able to provide laser beams 23 of extremely high quality without any cooling problems; furthermore, the use of single pumping diodes 21 provide the possibility of long work life and extremely reliable pumping architecture.

Lastly, the optical fibre Bragg gratings 22 provide resonant cavities syntonized with great precision on the emitted source wave length, as well as extremely stable emitted power.

As previously stated, this cutting method can be applied to sheet metal and metal plate such as steel, steel alloys, stainless steel, copper and copper alloys, aluminium and aluminium alloys, to cut thicknesses between 0.1 mm and 100 mm, in all shapes and sizes currently on the market; in addition, the same technology can be used on these materials for slot-cutting, drilling, pipe section and intersection (square, round, oval, rectangular), with thickness between 0.1 mm and 40 mm, and/or sections within a circle with a maximum diameter of approximately 920 mm and with a current market length of approximately 12,000 mm.

The use of fibre laser generators on cutting machines according to the invention, provides an obvious range of advantages, the first being the fact that, because the generator is constructed from modular units in solid state, this means the use of lasering gas can be eliminated completely, together with the relative piping and turbine for gas compression.

Furthermore, the fact that the laser beam travels inside the optical fibres, this permits the elimination of the optical bench laser beam transport, as well as the relative lens units and mirror units used in prior art systems.

Lastly, the cutting head 13 can be equipped with a single lens, with the addition of a protective shield and filter; this simple and efficient concept is able to guarantee long work life.

The use of fibre laser generators also provides very high beam density, since the beam power can be concentrated on a surface that varies between 0.05 mm and 0.1 mm; as a result, the piercing time is reduced to a minimum and cutting speed is increased considerably.

Considering the reduced energy consumption, spare parts, and technical gas required for cutting operations, the use of fibre laser generators lowers management and running costs to a great extent when compared to prior art cutting systems.

As was stated previously, the numerical control tool machine (CNC) for laser cutting according to the invention, also includes an automatic capacitative type guide system, with automatic height control of the fibre 20 laser cutting head 13; in fact the optical fibre 20 generated laser represents the actual cutting unit, in other words, the actual tool that performs the cutting of the material using the laser generator, while the automatic control system, illustrated in FIG. 5, maintains the focal point on the sheet metal and/or pipe 25 at a constant distance B by means of a capacitive sensor 24.

This application is completely innovative and is very important when cutting sheet metal and pipes using fibre lasers.

A further excellent technical characteristic of said tool machine according to the present invention is provided by a fibre 20 guide and protection system which moves the laser beam 23 on the machine.

Figure 6:
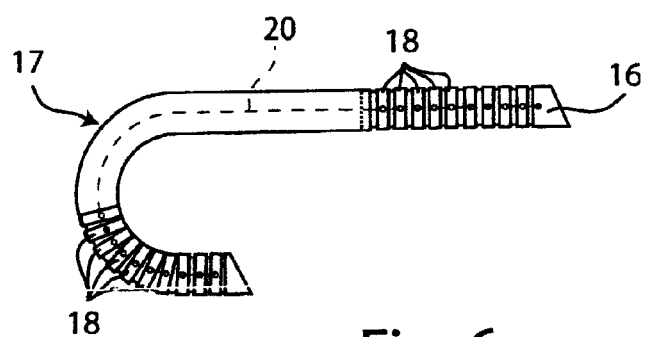
FIG. 6 shows a plane view from above of a fibre protection and guide system that moves the laser beam on the flatbed tool machine according to the invention.

The fibre 20 that transports the optical fibre laser is inserted inside a plastic protective sheath 16, and in turn inserted into a chain 17 of flexible tubing 18 with controlled curve radius, as can be seen in FIGS. 1, 2, 4, and 6; the plastic protection 16 is fixed at the beginning and the end of the chain 17, paying close attention to the fibre 20, which is compelled to flow through the interior of the protection 16 (as shown in detail in FIG. 6). The flow-through system described which provides for controlling the motion of the fibre and its level of wear, therefore permits the transport of the optical fibre 20 generated laser power in a reliable manner at industrial level for application in sheet metal and pipe 25 cutting, as described previously.

The descriptions above have clearly illustrated the characteristics of the tool machine for laser cutting of materials, object of the present invention, as they have also illustrated the obvious advantages.

Naturally numerous variants can be applied to the tool machine in question, while remaining within the context of the innovative concept of the invention, and obviously, in the practical embodiment of the invention, all materials, shapes and sizes of the details described can be of any type according to necessity and can be replaced with others which are technically equivalent.

The invention claimed is:

1. Machine tool for laser cutting of sheet and pipe materials comprising a support table for the materials, a main cutting unit, a control panel integrated on the machine, remote controlled and managed by a PC, and a laser cutting head, connected to a cooling unit and to a laser generator, which is inserted in the cutting unit and which is moveable over a work table or over a pipe support chuck by means of a numerical control system, characterised in that said laser cutting head is able to emit a laser beam, wherein the active gain medium is a doped optical fibre, in which the optical radiation is generated, and a plurality of single quartz pumping diodes are able to pump the doped ions, Bragg lens or gratings, placed across the laser beam and positioned between said pumping diodes and said materials, being also provided in order to create a laser resonant cavity and optical feedback, said laser cutting head being moved by means of a capacitive sensor of said numerical control system, so that the focal point of said Bragg lens or gratings on the materials is maintained at a constant distance (B) from said materials.

2. Machine tool according to claim 1, characterised in that said machine tool is destined for use in cutting sheet material and metal plate, as well as to cut slots, drill holes, sections and intersections of metal piping.

3. Machine tool according to claim 1, characterised in that said doped optical fibre is inserted inside a protective sheath and in turn inserted inside at least one chain of flexible tubing having controlled curve radius, said sheath being fixed to said chain and said optical fibre being compelled to flow through the inside of said sheath.

* * * * *